US010677741B2

(12) United States Patent
Connell et al.

(10) Patent No.: US 10,677,741 B2
(45) Date of Patent: Jun. 9, 2020

(54) LASER SURFACE TREATMENT AND SPECTROSCOPIC ANALYSIS SYSTEM

(71) Applicant: United States of America as represented by the Administrator of NASA, Washington, DC (US)

(72) Inventors: John W. Connell, Yorktown, VA (US); Frank L. Palmieri, Hampton, VA (US); William T. Yost, Newport News, VA (US); John W. Hopkins, Suffolk, VA (US); Rodolfo I Ledesma, Hampton, VA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 22 days.

(21) Appl. No.: 16/050,319

(22) Filed: Jul. 31, 2018

(65) Prior Publication Data

US 2019/0033231 A1 Jan. 31, 2019

Related U.S. Application Data

(60) Provisional application No. 62/538,920, filed on Jul. 31, 2017.

(51) Int. Cl.

| | |
|---|---|
| ***G01N 21/94*** | (2006.01) |
| ***H05H 1/00*** | (2006.01) |
| ***B23K 26/12*** | (2014.01) |
| ***B23K 26/08*** | (2014.01) |
| ***B08B 7/00*** | (2006.01) |
| ***B23K 26/50*** | (2014.01) |
| ***G01N 21/71*** | (2006.01) |
| *G01J 3/443* | (2006.01) |
| *B23K 26/0622* | (2014.01) |

(52) U.S. Cl.
CPC .......... *G01N 21/94* (2013.01); *B08B 7/0042* (2013.01); *B23K 26/0884* (2013.01); *B23K 26/127* (2013.01); *B23K 26/50* (2015.10); *G01N 21/718* (2013.01); *H05H 1/0037* (2013.01); *B23K 26/0622* (2015.10); *G01J 3/443* (2013.01)

(58) Field of Classification Search
CPC ...... G01N 21/94; G01N 21/718; B23K 26/50; B23K 26/0884; B23K 26/127; B23K 26/0622; B08B 7/0042; H05H 1/0037; G01J 3/443
See application file for complete search history.

(56) References Cited

U.S. PATENT DOCUMENTS 8,987,632 B2 3/2015 Wohl, Jr. et al.
2003/0147072 A1* 8/2003 Whitehouse ......... G01N 21/718 356/318

(Continued)

*Primary Examiner* — Hina F Ayub
(74) *Attorney, Agent, or Firm* — Jennifer L. Riley; Robin W. Edwards; Helen M. Galus

(57) ABSTRACT

Systems, methods, and devices of the various embodiments may enable simultaneous preparation of a substrate for adhesive bonding and detection of minute contaminants on the substrate. Various embodiments may enable detection of contaminants on a surface of a substrate while the surface of the substrate is being prepared for adhesive bonding by laser ablation. Various embodiments may provide an integrated laser treatment and measurement system.

17 Claims, 2 Drawing Sheets

(56) References Cited

U.S. PATENT DOCUMENTS

| | | | | |
|---|---|---|---|---|
| 2010/0301013 | A1* | 12/2010 | Conneely | B23K 26/032 216/83 |
| 2011/0086204 | A1 | 4/2011 | Wohl, Jr. et al. | |
| 2011/0155892 | A1* | 6/2011 | Neter | H04N 5/3559 250/208.1 |
| 2012/0293796 | A1* | 11/2012 | Ludowise | B01L 3/5027 356/244 |
| 2017/0023484 | A1* | 1/2017 | Wang | G01N 21/718 |
| 2017/0189945 | A1* | 7/2017 | LeClaire | B08B 7/0042 |

* cited by examiner

LASER SURFACE TREATMENT AND SPECTROSCOPIC ANALYSIS SYSTEM

CROSS-REFERENCE TO RELATED PATENT APPLICATION(S)

This patent application claims the benefit of and priority to U.S. Provisional Patent Application No. 62/538,920, filed on Jul. 31, 2017, the contents of which is hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Process control and monitoring can be advantageous for an array of manufacturing processes, such as advanced adhesive bonding of primary aircraft structural elements. For example, the final strength of a bonded joint for an aircraft structural component may depend upon the proper completion of a number of steps that make up the bonding process. To ensure that adhesive bonded aircraft components are safe to use on commercial transport aircraft, a certification methodology to verify that proper process control and monitoring is being used in adhesive bonding of those aircraft components is needed. Likewise, bonding of a coating or paint to a substrate can depend upon the proper completion of a number of steps that make up the bonding process.

One specific risk to the strength of adhesive bonds is the presence of contaminants, such as silicones, oils, greases, etc., on the surfaces during bonding. One such group of contaminants is silicones, which have been identified as the most detrimental surface contaminates leading to weak adhesive bonds even at exceptionally low concentrations. Unfortunately, silicone coatings are widely used in composite and metal processing of parts for aircraft, for example as mold release agents. As such, silicone residue is often left behind on aircraft parts that need to be adhesively joined. There is a significant need to remove silicone contaminants from fabricated part surfaces while simultaneously providing a surface ready for adhesive bonding in a reproducible, reliable, and automatable manner. There is also a need to be able to detect exceptionally low levels of silicone contaminants known to cause bonding problems (e.g., less than 2 micrograms/cm$^2$), in a manner that is rapid, that is straight forward, that can be used in ambient environments, and that does not require special sample preparation techniques.

BRIEF SUMMARY OF THE INVENTION

Systems, methods, and devices of the various embodiments may enable simultaneous preparation of a substrate for adhesive bonding and detection of minute contaminants on the substrate. Various embodiments may enable detection of contaminants on a surface of a substrate while the surface of the substrate is being prepared for coating, painting, and/or adhesive bonding by laser ablation. Various embodiments include an integrated laser/spectroscopic analysis system in which the laser may be used for the surface treatment of a variety of substrates to remove contaminants, create topography, and/or create chemically reactive species. The laser may also serve to excite the surface of the substrates to allow for spectroscopic analysis and characterization of chemical and elemental species that emanate from that surface, thus giving an indication of the effectiveness of the removal of contaminants by the laser surface treatment. The various embodiments may operate under ambient environmental conditions, may require no sample preparation, may provide near real time feedback on surface composition, and may detect levels of contaminants below those known to be a threat to adhesive bonding.

Various embodiments may provide an integrated laser treatment and measurement system including a laser, a spectrometer including an optical detector and spectrograph, and a processor connected to the laser and spectrometer. The processor may be configured to control the laser to ablate a surface of a substrate with a beam to generate a plasma plume, control the spectrometer to output, to the processor, a plurality of signal values from emitted light from the plasma plume, and identify one or more surface contaminants of the substrate based on the plurality of signal values.

Various embodiments may provide a method for integrated laser treatment and spectroscopic analysis including providing a substrate, ablating a surface of the substrate with a beam from a laser to generate a plasma plume, and performing laser induced breakdown spectroscopy on the plasma plume to identify one or more surface contaminants of the substrate, wherein the ablation of the surface of the substrate forms a topographical pattern at the surface in preparation for further manufacturing of the substrate.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate various embodiments of the invention, and together with the general description given above and the detailed description given below, serve to explain the features of the invention.

DETAILED DESCRIPTION OF THE INVENTION

Figure 1:
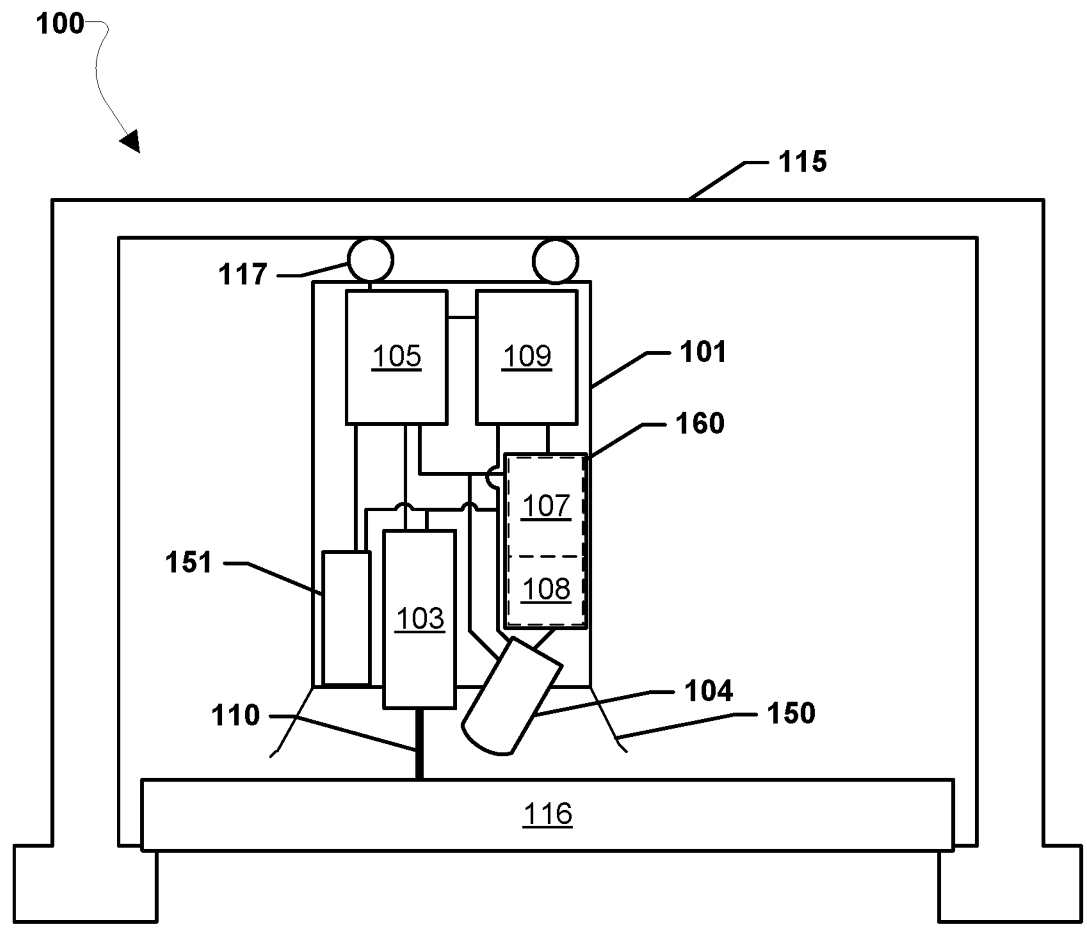
FIG. 1 is a block diagram of an embodiment laser treatment and measurement system.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

Surface preparation for coating, painting, and adhesive bonding removes contamination (e.g., silicones, oils, greases, fluoropolymers, cosmetics, machine oil, latex glove residue, etc.), imparts roughness, and chemically activates a surface to enhance adhesion. Methods such as solvent wiping, sanding, grit blast, and peel ply can remove contaminates, but often leave behind debris such as grit, polymer powder, or loose fibers that may be detrimental to bond performance. Such methods also lack the reproducibility needed for highly controlled, automated surface preparation.

Laser ablation is a method of using intense laser irradiation to remove contamination and surface layers similar to conventional grit blasting and sanding methods, but with no residual grit, no subsequent cleaning required, and with a high potential for automation.

Laser induced breakdown spectroscopy (LIBS) measures the radiation emitted from a plasma plume formed during an ablation event in near real-time without any sample preparation or special atmospheric conditions. LIBS can measure residual silicone surface contamination at very low levels, and therefore, effectively detects silicone below the threshold concentration where bond performance may be compromised. LIBS is an elemental characterization technique that detects the photonic emissions from the laser induced plasma plume to obtain the chemical information of a target material. The hot induced plasma plume generated by the laser pulse expands into the ambient atmosphere. As the plasma plume cools down and the excited elements therein return to the ground state, the plume emits photons at different wavelengths that are characteristic to the target material.

Various embodiments include an integrated laser/spectroscopic analysis system in which the laser may be used for the surface treatment of a variety of substrates to remove contaminants (e.g., silicones, oils, greases, fluoropolymers, cosmetics, machine oil, latex glove residue, etc.), create topography, and/or create chemically reactive species. The laser may also serve to excite the surface of the substrates to allow for spectroscopic analysis and characterization of chemical and elemental species that emanate from that surface, thus giving an indication of the effectiveness of the removal of contaminants by the laser surface treatment. The various embodiments may operate under ambient environmental conditions, may require no sample preparation, may provide near real time feedback on surface composition, and may detect levels of contaminants below those known to be a threat to adhesive bonding.

Systems, methods, and devices of the various embodiments may enable simultaneous preparation of a substrate for adhesive bonding and detection of minute contaminants on the substrate. Various embodiments may enable detection of contaminants (e.g., silicones, oils, greases, fluoropolymers, cosmetics, machine oil, latex glove residue, etc.) on a surface of a substrate, such as a substrate that may be a polymer, a ceramic, a metal, a metal alloy, a fiber (e.g., carbon fiber, etc.) reinforced composite thereof, etc., while the surface of the substrate is being prepared for coating, painting, or adhesive bonding by laser ablation. The detection of contaminants on the surface of a substrate while the surface is being prepared for coating, painting, or adhesive bonding may ensure that the contaminants (e.g., silicones, oils, greases, fluoropolymers, cosmetics, machine oil, latex glove residue, etc.) are removed prior to the start of the bonding processes. Various embodiments may enable the removal of contaminants (e.g., silicones, oils, greases, fluoropolymers, cosmetics, machine oil, latex glove residue, etc.) from fabricated part surfaces while simultaneously providing a surface ready for coating, painting, or adhesive bonding in a reproducible, reliable, and automatic manner. Various embodiments may be configured to detect exceptionally low levels (e.g., less than 2 micrograms/cm$^2$) of contaminants, such as silicone contaminants, etc., in a manner that is rapid, that is straight forward, that can be used in ambient environments, and that does not require special sample preparation techniques.

Various embodiments may provide an integrated laser treatment and measurement system. The laser treatment and measurement system may include a laser configured to produce a beam. The beam may be a pulsed beam having a single pulse or a plurality of repeating pulses. The laser treatment and measurement system may include one or more optical elements configured to collect emitted light from a plasma plume generated by the beam of the laser. The laser treatment and measurement system may include one or more spectrometers connected to the optical elements and configured to produce one or more signal values from the emitted light collected by the optical elements. The one or more spectrometers may include one or more optical detectors coupled to one or more spectrographs. The laser treatment and measurement system may include a processor connected to the laser, the one or more optical elements, and the one or more spectrometers. The processor may be configured to control the operation of the laser, the one or more optical elements, and the one or more spectrometers, as well as the one or more optical detectors and one or more spectrographs of the one or more spectrometers. In various embodiments, the processor may be configured to trigger the laser to emit one or more pulses onto a surface of a substrate, open a data acquisition window after a delay period following the triggering of the laser, and control the one or more optical elements and the one or more spectrometers to collect emitted light from a plasma plume created by the one or more pulses of the laser on the substrate, generate a plurality of signal values from the emitted light from the plasma plume during the data acquisition window, and send the plurality of signal values to the processor during the data acquisition window. The processor may be configured to identify one or more elements based on the received signal values. The processor may be configured to control the operation of the laser to prepare the surface of the substrate for adhesive bonding, such as by ablating the surface of the substrate to form a topographical pattern at the surface. Topographical patterns may be any type patterns, such as patterns formed from a linear array of overlapping linear lines, more complex patterns, etc. The integrated laser treatment and measurement system may be configured to analyze chemicals on the surface of the substrate without requiring that a sample of the substrate be removed. The integrated laser treatment and measurement system may be configured to analyze chemicals on the surface of the substrate in an ambient atmosphere without the need for any special process gases or atmospheric controls.

Integrated laser treatment and measurement systems according to the various embodiments may enable the integration of surface treatment processes with surface chemical analysis processes. Various embodiments may enable the detection of silicone levels below that known to be a threat to adhesive bonding. Integrated laser treatment and measurement systems according to the various embodiments may enable the detection of silicone levels below that known to be a threat to adhesive without specialized (and time consuming) sample preparation methods. Integrated laser treatment and measurement systems according to the various embodiments may operate under ambient conditions (i.e., may not require inert atmosphere or vacuum). Integrated laser treatment and measurement systems according to the various embodiments may provide a characterization process for chemical identification that may be nearly non-destructive (i.e., the ablation that occurs during characterization is indistinguishable from surface ablation created during surface preparation by ablation for adhesive bonding). Integrated laser treatment and measurement systems according to the various embodiments may provide rapid analysis and feedback of results (e.g., in milliseconds to seconds, etc.). Integrated laser treatment and measurement systems according to the various embodiments may be configured to detect multiple chemical elements at the same time.

FIG. 1 is a block diagram of an embodiment laser treatment and measurement system 100. The system 100 may include a laser 103, one or more optical elements 104, one or more spectrometers 160 connected to the optical elements 104, and a processor 105 connected to the laser 103, optical elements 104, and spectrometers 160. In various embodiments, the one or more spectrometers 160 may include one or more optical detectors 107 coupled to one or more spectrographs 108. In some embodiments, the optical elements 104 may be connected to the one or more spectrographs 108 of the one or more spectrometers 160. The system 100 may be configured to perform laser ablation and/or LIBS on a surface of a substrate 116, such as a substrate 116 formed from one or more polymer, one or more ceramic, one or more metal, one or more metal alloy, one or more fiber (e.g., carbon fiber, etc.) reinforced composites thereof (e.g., carbon fiber reinforced polymers (CFRPs) etc.), etc.

The system 100 may include a power source 109 connected to the laser 103, optical elements 104, spectrometers 160 (e.g., connected to optical detectors 107 and/or to spectrographs 108, etc.), and processor 105. The power source 109 may be any type of power source, such as a battery, a coupling to a power line or cord, etc. The power source 109 may provide electrical power to the laser 103, optical elements 104, spectrometers 160 (e.g., to optical detectors 107 and/or to spectrographs 108, etc.), and processor 105. In various embodiments, the processor 105 may be configured to control the discharge of electrical power from the power source 109 to the laser 103, optical elements 104, spectrometers 160 (e.g., to optical detectors 107 and/or to spectrographs 108, etc.), and/or the processor 105 itself, such as by opening or closing one or more controllable switches. The power source 109, laser 103, optical elements 104, spectrometer 160, and processor 105 may be supported in a housing 101. The housing 101 may be configured such that the laser 103 and the optical elements 104 may protrude from the housing 101 toward a surface of a substrate 116 being treated and measured by the system 100.

The laser 103 may be configured to produce a beam 110. The beam 110 may be a pulsed beam having a single pulse or a plurality of repeating pulses. The laser 103 may include various devices configured to produce and monitor the beam 110, such as focal lenses, power sensors, etc. The laser 103 may be any type of laser configured to ablate the surface of the substrate 116. For example, the laser 103 may be a laser as described in U.S. Pat. No. 8,987,632, the entire contents of which are hereby incorporated by reference for all purposes. As a specific example, the laser 103 may include an Ekspla, Atlantic 20, frequency tripled, Nd:$YVO_4$ laser source, a 250 mm focal length f-theta lens (S4LFT6062/075) from Sill Optics, and a thermopile sensor (Model 3A) and Nova II power meter from Ophir-Spiricon LLC. The laser 103 may be controlled by the processor 105 to generate the beam 110. The processor 105 may control the laser 103 to change one or more attributes of the beam 110, such as the beam's 110 power, wavelength, frequency, beam width, etc. The processor 105 may control the laser 103 to generate the beam 110 to ablate the surface of the substrate 116. For example, the processor 105 may control the laser 103 to ablate the surface of the substrate 116 to prepare the surface for adhesive bonding, as described in U.S. Pat. No. 8,987,632 the entire contents of which are herein incorporated by reference in its entirety. The processor 105 may control the laser 103 to generate the beam 110 such that the beam 110 causes chemical elements at the surface of the substrate 116 where the beam 110 is incident to break down thereby generating a plasma plume at the surface of the substrate 116. In some embodiments, the beam 110 may have the same attributes when being controlled to ablate the surface of the substrate 116 as when being controlled to generate the plasma plume. In some embodiments, the beam 110 may have a first set of attributes when being controlled to generate the plasma plume and a second set of different attributes when being controlled to ablate the surface of the substrate 116.

The optical elements 104 may be collimators collecting spectral emissions and guiding them to the spectrometers 160 (e.g., to the optical detectors 107 of the spectrometers 160, etc.). The spectrometers 160 may include a spectrograph 108 coupled to an optical detector 107, such as an electron-multiplier intensified charge-coupled device (emICCD) camera. The spectrometers 160, such as via their optical detectors 107, may generate a plurality of signal values from emitted light measured by the spectrometers 160 and output those signal values to the processor 105. The spectrometers 160 may be triggered by the processor 105 to measure the emitted light and output the signal values during a data acquisition window. The data acquisition window may be a period of time after the triggering of the laser 103, such as a period of time following a delay period after triggering the laser 103. Together the laser 103, the optical elements 104, and the spectrometers 160 may operate as a LIBS device. As a specific example, an optical element 104 may be a collimator connected to the spectrometer 160 by an optical cable with 19 fibers (200 μm each) and the spectrometer 160 may include a spectrograph 108 that is a 328 mm, f/4.6 Schmidt-Czerny-Turner (SCT) spectrograph Iso-Plane SCT 320 from Princeton Instruments connected to an optical detector 107 that is a PI-MAX4: 1024 EMB, Princeton Instruments eMICCD camera. The laser 103, optical elements 104, and spectrometers 160 may enable the detection of surface contaminants at low levels, such as less than 2 micrograms/$cm^2$, less than 1 micrograms/$cm^2$, etc.

The housing 101 may be supported over the substrate 116 by a gantry 115 and may be connected to the gantry 115 by one or more motorized wheels 117 or other type gantry 115 traversing systems. The motorized wheels 117 or other type gantry 115 traversing systems may be connected to, and controlled by, the processor 105. The processor 105 may activate the motorized wheels 117 or other type gantry 115 traversing systems to move the housing 101, and thereby the laser 103, beam 110, and optical elements 104, over the surface of the substrate 116. For example, the housing 101 may be moved in three dimensions relative to the substrate 116 (e.g., vertically, longitudinally, and/or latitudinally) by the motorized wheels 117 or other type gantry 115 traversing systems. In this manner, the beam 110 may be moved by the processor 105 over the surface of the substrate 116. While illustrated in FIG. 1 as a gantry 115 based system 100, the gantry 115 is only an example system for traversing the housing 101, and other type motive systems may be used to support and move the housing 101 in various embodiments. As examples, the housing 101 may be coupled to a robotic arm, to a lift, or to any other type device that may move the housing relative to the substrate 116. A robotic arm may be useful when the substrate 116 is not a uniform shape, thereby enabling the housing 101 to be moved around protrusions of the substrate 116, for example across the entire surface of an aircraft. Additionally, the substrate 116 May be moved and the housing 101 may be stationary and/or moving in various embodiments. The housing 101 may be suspended over the substrate 116 in the ambient atmosphere (i.e., without any, special process gases or atmospheric controls). Optionally, the housing 101 may not include any pumps or other systems for applying process gases to the substrate 116 during ablation and/or LIBS. The housing 101 may include safety features, such as a shield (or shroud) 150 configured to separate human users of the system 100 from the beam 110 of the laser 103. While illustrated in FIG. 1 as a shield 150 coupled to the housing 101, the shield 150 may be located on other portions of the system 100, such as gantry 115, etc., and/or other laser protection features, as well as other safety features (e.g., guards, rails, windows, barriers, etc.), may be incorporated in the system 100 to protect humans from the beam 110 of the laser 103 and/or other dangers inherent in the system 100. The housing 101 may include a vacuum system 151, such as a high efficiency particulate air (HEPA) vacuum system, etc., connected to the power source 109 and processor 105. The processor 105 may control the operation of the vacuum system 151 to capture any fumes and/or particulates that may be generated during ablation and/or LIBS.

The processor 105 may control the triggering of the laser 103 to enable LIBS of the surface of the substrate 116. The processor 105 may move the housing 101 to perform LIBS at different points on the surface of the substrate 116. For example, the processor 105 may move the housing 101 to perform LIBS at every two inches of the substrate 116, at every foot of the substrate 116, across the entire substrate 116, etc. The processor 105 may receive the output the signal values during a data acquisition window and apply LIBS techniques to the signal values to characterize the chemical elements on the surface of the substrate 116. An example LIBS technique that may be used in the various embodiments may be to quantify the silicone content on the surface of the substrate 116 in terms of the silicon-to-carbon (Si/C) ratio calculated from the silicon and carbon peak heights in the LIBS spectrum. Based at least in part on the chemical elements identified on the surface of the substrate 116, the processor 105 may control the ablation process of the surface of the substrate 116. In this manner, the processor 105 may enable closed-loop control of the ablation process. For example, the processor 105 may control the laser 103 and spectrometers 160 to perform LIBS at a point on the surface of the substrate 116 before controlling the laser 103 to ablate that point on the surface of the substrate 116. The processor 105 may control the laser 103 and spectrometers 160 to perform LIBS after ablating that point on the surface of the substrate 116. The processor 105 may compare the surface contaminate level indicated by the LIBS before ablation to the surface contaminate level indicated by the LIBS after ablation to ensure the surface contaminate level is below a threshold for adhesive bonding processes. In some embodiments, the processor 105 may control the laser 103 and spectrometers 160 to perform LIBS at the same time the laser 103 is controlled to perform surface ablation on the substrate 116. In some embodiments, the processor 105 may control the laser 103 and spectrometers 160 to perform LIBS before the laser 103 is controlled to perform surface ablation on the substrate 116. In some embodiments, the processor 105 may control the laser 103 and spectrometers 160 to perform LIBS after the laser 103 is controlled to perform surface ablation on the substrate 116.

Figure 2:
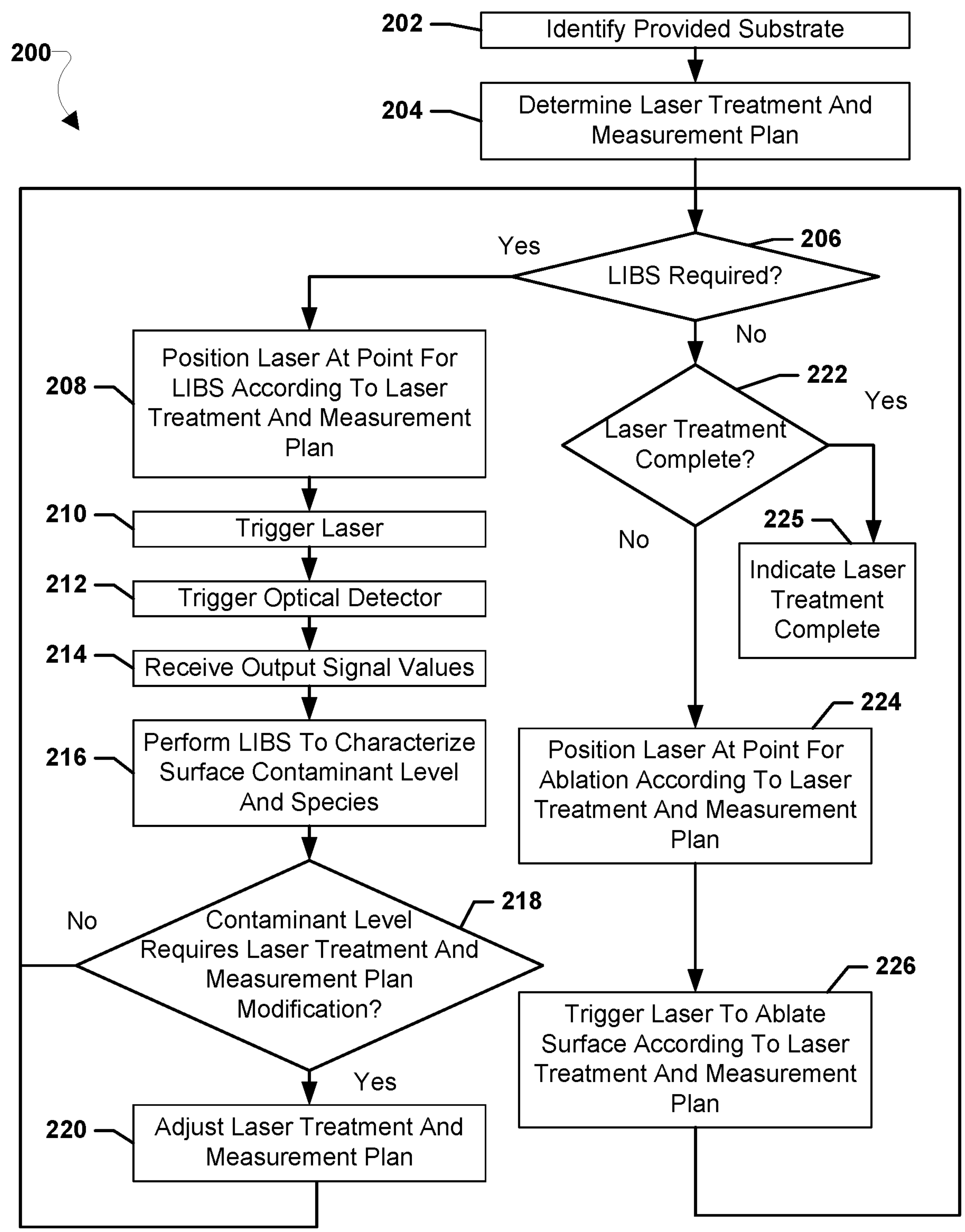
FIG. 2 is a process flow diagram illustrating an embodiment method for detecting contaminants on a surface of a substrate while the surface of the substrate is being prepared for further manufacturing.

FIG. 2 is a process flow diagram illustrating an embodiment method 200 for detecting contaminants (e.g., silicones, oils, greases, fluoropolymers, cosmetics, machine oil, latex glove residue, etc.) on a surface of a substrate while the surface of the substrate is being prepared for further manufacturing, such as adhesive bonding. With reference to FIGS. 1 and 2, the method 200 may be performed by a processor of a laser treatment and measurement system, such as laser treatment and measurement system 100. The method 200 may be performed after a substrate is provided to have its surface ablated for further manufacturing, such as ablated to form a topographical pattern at the surface in preparation for adhesive bonding, coating, painting, etc. The topographical pattern may be any type pattern, such as a pattern formed from a linear array of overlapping linear lines, more complex patterns, etc. The method 200 may be performed in an ambient atmosphere with no special process gas provided to the substrate. The method 200 may be performed on the substrate that will be used in manufacturing itself, without any special sample preparation or removal of a portion of the substrate for testing separate from surface preparation.

In block 202, the processor may identify the provided substrate. For example, the processor ma determine the size, shape, composition, and/or any other attributes of the substrate. The processor may identify the provided substrate and/or its attributes based on data provided to the processor, such as a computer aided design (CAD) file of the substrate.

In block 204, the processor may determine a laser treatment and measurement plan for the substrate. The laser treatment and measurement plan may indicate the topographical pattern to be ablated onto the surface of the substrate, the point or points on the surface at which to trigger the laser for ablation, the point or points on the surface at which to trigger the laser for LIBS, the spacing between points on the surface at which to conduct LIBS, the order of operations for conducting laser ablation and/or LIBS on the surface, the path across the substrate surface to traverse, the acceptable contaminant level for the surface of the substrate, etc. The topographical pattern to be ablated onto the surface of the substrate may be any type pattern, such as a pattern formed of overlapping linear lines, patterns as described in U.S. Pat. No. 8,987,632, more complex patterns, etc. The topographical pattern may be selected to ensure no surface area of the substrate is untreated by the laser. The topographical pattern may be a composite of two or more topographical patterns. For example, the desired surface area of the substrate may be completely ablated with lines in a first part of the topographical pattern (itself a first topographical pattern) to remove contaminates on the surface, and then the desired surface area of the substrate may be ablated with another pattern in a second part of the topographic pattern (i.e., a second topographical pattern on top of the first topographical pattern) to give some desirable mechanical strength enhancement and/or to control how the bond fails mechanically. In some embodiments, the laser treatment and measurement plan may be pre-loaded in a memory available to the processor of the laser treatment and measurement system.

In determination block 206, the processor may determine whether LIBS is required. For example, the processor may determine whether LIBS is required based on the laser treatment and measurement plan.

In response to determining that LIBS is required (i.e., determination block 206="Yes"), the processor may position the laser at a point for LIBS according to the laser treatment and measurement plan in block 208. For example, the processor may control a gantry system, robotic arm, wheels, or any other type motive system to position the housing of the laser treatment and measurement system such that the laser's beam will contact the point at which LIBS is to be performed.

In block 210, the processor may trigger the laser. For example, the processor may send a signal powering the laser on and controlling the laser to generate a beam. The processor may control the laser such that the beam has a beam width, pulse width, number of pulses, power, wavelength, frequency, and/or any other attribute selected for LIBS. Triggering the laser may cause a beam to be incident on the surface of the substrate thereby inducing a plasma plume of the elements at that point on the surface of the substrate.

In block 212, the processor may trigger the optical detector. For example, the processor may trigger the optical detector after a delay period following triggering the laser has expired. The optical detector may be triggered to generate a plurality of signal values from the emitted light from the plasma plume during a data acquisition window. The data acquisition window may be a period of time equal to the time needed to capture a number of frames of data with the optical detector of the laser treatment and measurement system.

In block 214, the processor may receive output signal values from the optical detector and in block 216, the processor may perform LIBS to characterize surface contaminant levels and species of the substrate. For example, the processor may analyze the output signal values to detect emission lines corresponding to various chemicals, such as carbon, silicone, etc., to characterize surface contaminant levels and species. In various embodiments, the processor may be configured to detect low levels of surface contaminants, such as less than 2 micrograms/cm$^2$, less than 1 micrograms/cm$^2$, etc.

In determination block 218, the processor may determine whether the contaminant level requires laser treatment and measurement plan modification. For example, a higher than expected contaminant level may indicate additional ablation of the surface, higher laser power settings, additional LIBS testing, etc., may be required to remove the contaminant and/or ensure the contaminant is removed from the surface. In response to determining that the contaminant level does not require laser treatment and measurement plan modification (i.e., determination block 218="No"), the processor may return to determination block 206. In response to determining that the containment level does require laser treatment and measurement modification (i.e., determination block 218="Yes"), the processor may adjust the laser treatment and measurement plan as needed in block 220 and return to determination block 206.

In response to determining that LIBS is not required determination block 206="Yes"), the processor may determine whether laser treatment is complete in determination block 222. For example, the processor may determine whether laser treatment is complete by comparing a listing of points to be ablated in the laser treatment and measurement plan to the list of points already ablated. Points to be ablated without corresponding points already ablated may indicate laser treatment is not complete. In response to determining that laser treatment is not complete (i.e., determination block 222="No"), the processor may position the laser at a point for ablation according to the laser treatment and measurement plan in block 224. For example, the processor may control a gantry, system, robotic arm, wheels, or any other type motive system to position the housing of the laser treatment and measurement system such that the laser's beam will contact the point at which laser ablation is to be performed.

In block 226, the processor may trigger the laser to ablate the surface according to the laser treatment and measurement plan. For example, the processor may send a signal powering the laser on and controlling the laser to generate a beam. The processor may control the laser such that the beam has a beam width, pulse width, number of pulses, power, wavelength, frequency, and/or any other attribute selected for laser ablation of the surface of the substrate. Triggering the laser may cause a beam to be incident on the surface of the substrate thereby ablating the surface to form a topographical pattern in preparation for further manufacturing, such as to form a topographical pattern at the surface in preparation for adhesive bonding. In response to triggering the laser, the processor may return to determination block 206 to determine whether LIBS is required. In this manner, the processor may alternate between controlling the laser treatment and measurement system to perform LIBS and to perform laser ablation. In response to determining that LIBS is not required (i.e., determination block 206="No") and that laser treatment is complete (i.e., determination block 222="Yes"), the processor may indicate laser treatment is complete in block 225. The substrate may then be ready for further manufacturing, such as coating, painting, and adhesive bonding.

Various embodiments may be useful in various different types of manufacturing, such as aerospace manufacturing, automotive manufacturing, medical manufacturing, etc. Various embodiments may be useful in manufacturing of coated, painted, and adhesively bonded aircraft components. For example, an embodiment laser treatment and measurement system may enable silicone release agent contaminates to be removed from two composite parts to be bonded together while the surfaces of the parts are being prepared for bonding. Various embodiments may be useful in painting aircraft. For example, an embodiment laser treatment and measurement system may prepare the aircraft skin for painting while also ensuring that contaminants on the aircraft skin are removed before paint is applied. Various embodiments may be useful in bonding automotive parts. For example, an embodiment laser treatment and measurement system may prepare joint surfaces between two automotive parts by removing lubricant from the joint surfaces while also activating the joint surfaces in preparation for joining the surfaces.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In the various embodiments described herein the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments can be performed in any order. Words such as "thereafter," "then," "next," etc. are not intended to limit the order of the operations; these words are simply used to guide the reader through the description of the methods. Further, the terms "first," "second," and the like herein do not denote any order, quantity, or importance, but rather are used to distinguish one element from another.

The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for use during manufacturing of a substrate in accordance with a laser treatment and measurement plan, the system comprising:

a laser;

a spectrometer, comprising an optical detector and a spectrograph; and a processor connected to the laser and spectrometer, wherein the processor is configured to perform a laser treatment and measurement plan to:

(1) control the laser to ablate a surface of a substrate with a beam to form a topographical pattern at the surface in preparation for further manufacturing of the substrate, wherein ablation of the surface generates a plasma plume;

(2) control the spectrometer to output to the processor a plurality of signal values from emitted light from the plasma plume;

(3) identify one or more surface contaminants of the substrate based on the plurality of signal values and determining a level of at least one identified contaminant;

(4) decide, based on said level of at least one identified contaminant, whether or not the laser treatment and measurement plan is to be modified; and (5) modify the laser treatment and measurement plan being performed by the processor if a decision is made at (4) to modify the laser treatment and measurement plan and repeat at least (1) and (2) in accordance with the modified laser treatment and measurement plan.

2. The system of claim 1, wherein the topographical pattern is a linear array of overlapping lines.

3. The system of claim 1, wherein the further manufacturing of the substrate is coating, painting, or adhesive bonding.

4. The system of claim 1, wherein controlling the spectrometer to output the plurality of signal values from the emitted light from the plasma plume comprises opening a data acquisition window after a delay period from the laser ablating the surface of the substrate.

5. The system of claim 1, wherein the beam comprises a plurality of repeating pulses.

6. The system of claim 1, further comprising a housing supporting the laser, the spectrometer, and the processor, the housing configured to traverse across the surface of the substrate.

7. The system of claim 6, further comprising, a gantry or a robotic arm moveably supporting the housing.

8. The system of claim 7, further comprising a shield coupled to the housing and configured to separate a user of the system from the beam.

9. The system of claim 1, wherein the substrate is one or more of a polymer, a ceramic, a metal, a metal alloy, and a fiber reinforced composite.

10. The system of claim 9, wherein the substrate is a carbon fiber reinforced polymer.

11. The system of claim 1, wherein the optical detector further comprises an electron-multiplier intensified charge-coupled device camera coupled to the spectrograph.

12. A method for integrated laser treatment and spectroscopic analysis during manufacturing of a substrate in accordance with a laser treatment and measurement plan, the method comprising:

providing the substrate;

(1) ablating a surface of the substrate with a beam from a laser in accordance with the laser treatment and measurement plan to form a topographical pattern at the surface in preparation for further manufacturing of the substrate, Wherein ablation of the surface generates a plasma plume;

(2) performing laser induced breakdown spectroscopy on the plasma plume to identify one or more surface contaminants of the substrate and determining a level of at least one identified contaminant;

(3) deciding, based on said level of at least one identified contaminant, whether or not to modify the laser treatment and measurement plan;

(4) modifying the laser treatment and measurement plan if a decision is made that the laser treatment and measurement plan is to be modified; and (5) if the laser treatment and measurement plan is modified at step (4), repeating at least steps (1) and (2) in accordance with the modified laser treatment and measurement plan.

13. The method of claim 12, Wherein the further manufacturing of the substrate is coating, painting, or adhesive bonding.

14. The method of claim 12, wherein the beam comprises a plurality of repeating pulses.

15. The method of claim 14, wherein the ablation is performed under ambient environmental conditions.

16. The method of claim 12, wherein the substrate is one or more of a polymer, a ceramic, a metal, a metal alloy, and a fiber reinforced composite.

17. The method of claim 16, wherein the substrate is a carbon fiber reinforced polymer.

* * * * *